(12) United States Patent
Richardson et al.

(10) Patent No.: US 6,882,274 B2
(45) Date of Patent: Apr. 19, 2005

(54) ENERGY CONSERVING SATELLITE TRACKING TAG

(75) Inventors: David L. Richardson, Arlington Heights, IL (US); Barry L. Head, Arlington Heights, IL (US)

(73) Assignee: Northrop Grumman Corporation, Los Angeles, CA (US)

(*) Notice: Subject to any disclaimer, the term of this patent is extended or adjusted under 35 U.S.C. 154(b) by 583 days.

(21) Appl. No.: 09/847,475

(22) Filed: May 2, 2001

(65) Prior Publication Data

US 2004/0145520 A1 Jul. 29, 2004

(51) Int. Cl.[7] ............................. G08B 1/08; G08B 13/14
(52) U.S. Cl. ............................. 340/539.13; 340/572.1; 340/825.36; 340/825.49; 340/333; 235/384
(58) Field of Search .................. 340/538.13, 825.36, 340/825.49, 572.1, 10.1, 10.34, 333, 693.1, 693.2, 693.4, 10.33; 235/375, 384

(56) References Cited

U.S. PATENT DOCUMENTS

| | | | |
|---|---|---|---|
| 4,885,571 A | 12/1989 | Pauley et al. | 340/573 |
| 4,897,642 A | 1/1990 | DiLullo et al. | 340/825.06 |
| 4,952,913 A | 8/1990 | Pauley et al. | 340/573 |
| 4,952,928 A | 8/1990 | Carroll et al. | 340/825.54 |
| 5,014,206 A | 5/1991 | Scribner et al. | 364/449 |
| 5,266,944 A | 11/1993 | Carroll et al. | 340/825.36 |
| 5,396,277 A | 3/1995 | Gast et al. | 347/33 |
| 5,491,486 A * | 2/1996 | Welles, II et al. | 342/357.07 |
| 5,592,173 A * | 1/1997 | Lau et al. | 342/357.12 |
| 5,629,981 A | 5/1997 | Nerlikar | 380/25 |
| 5,666,647 A | 9/1997 | Maine | 455/12.1 |
| 5,686,902 A * | 11/1997 | Reis et al. | 340/10.2 |
| 5,712,899 A | 1/1998 | Pace, II | 379/58 |
| 5,751,246 A | 5/1998 | Hertel | 342/357 |
| 5,774,876 A | 6/1998 | Woolley et al. | 705/28 |
| 5,831,519 A | 11/1998 | Pedersen et al. | 340/425.5 |
| 5,890,068 A | 3/1999 | Fattouche et al. | 455/456 |
| 5,892,441 A | 4/1999 | Woolley et al. | 340/539 |
| 5,894,266 A | 4/1999 | Wood, Jr. et al. | 340/539 |
| 6,133,871 A * | 10/2000 | Krasner | 342/357.06 |

* cited by examiner

Primary Examiner—Donnie L. Crosland
(74) Attorney, Agent, or Firm—Stetina Brunda Garred & Brucker

(57) ABSTRACT

An energy conserving tracking tag for receiving a radio frequency location data signal from a global positioning satellite and for communicating with a tracking system. The tag includes a receiver circuit for receiving the location data signal from the global positioning satellite, a customer ID module for generating a unique tag identification signal, a transponder circuit for receiving command signals from the tracking system, and a power circuit electrically engageable with a battery power supply and an external power source. The tag also includes a programmable microprocessor in electrical communication with the power circuit, receiver circuit, customer ID module, and transponder circuit. The microprocessor is operative to collect the location data signal, the identification signal, and the command signals, and subsequently produce an composite output signal. The transponder is further operative to transmit the composite output signal to the tracking system by radio carrier wave.

41 Claims, 8 Drawing Sheets

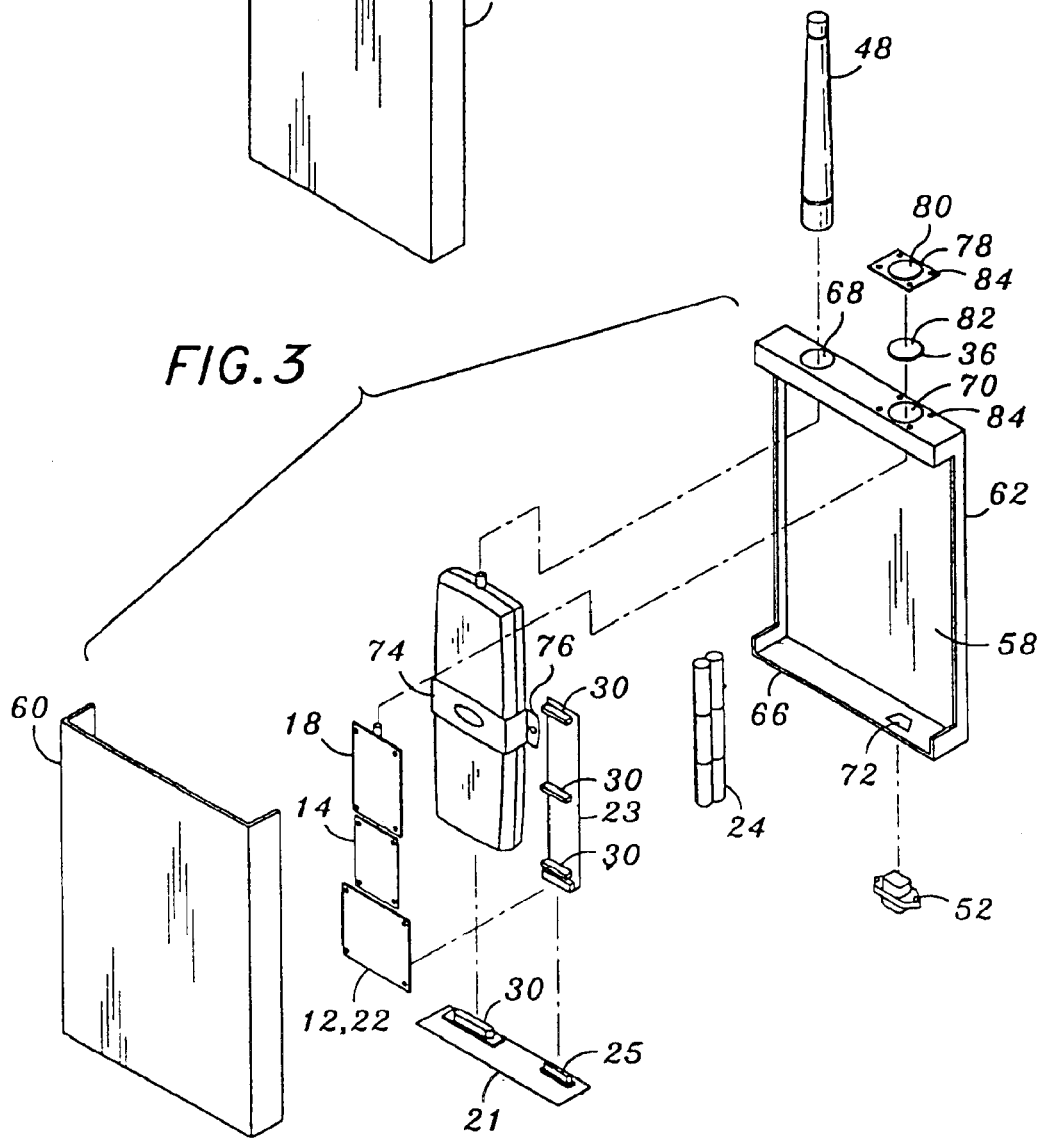

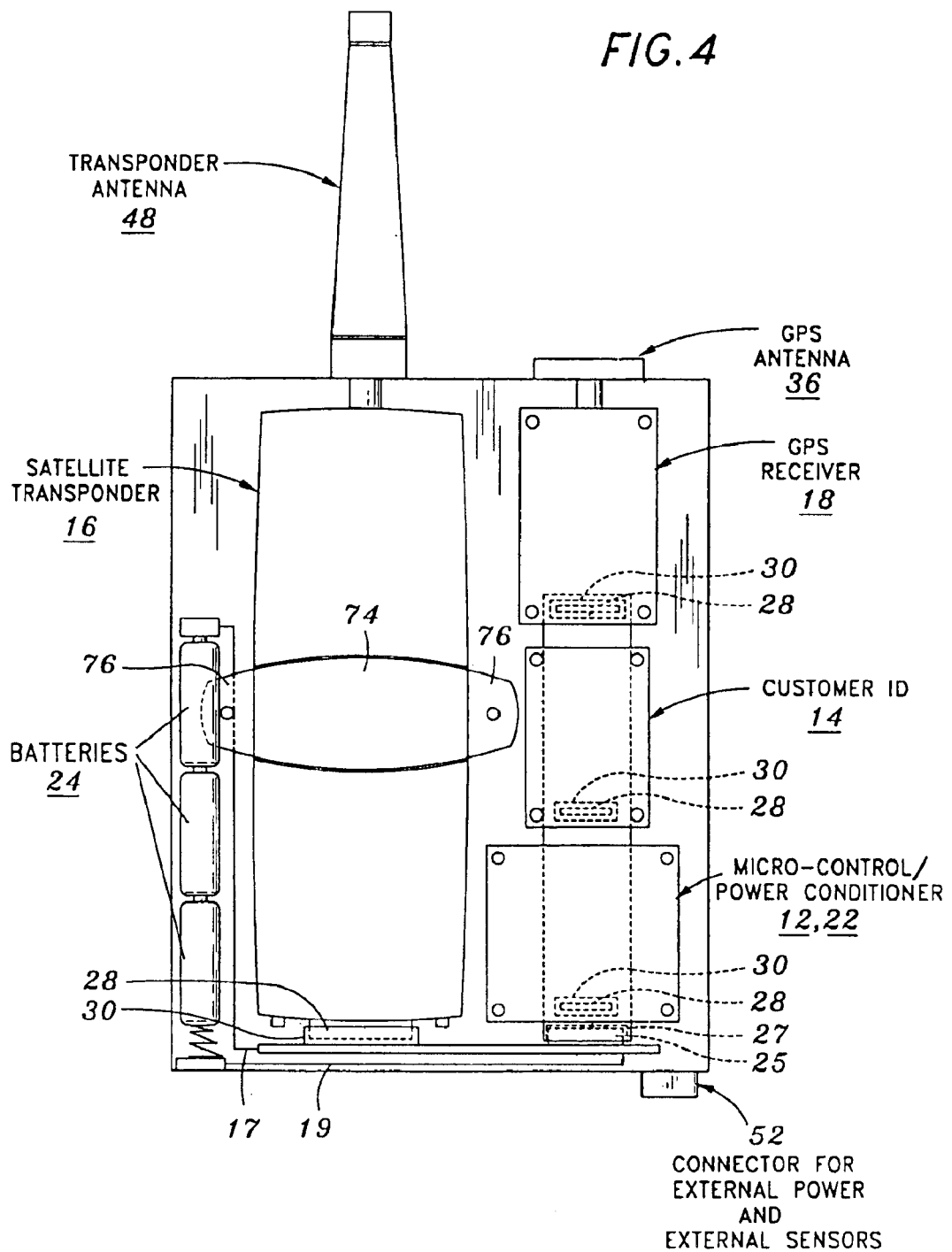

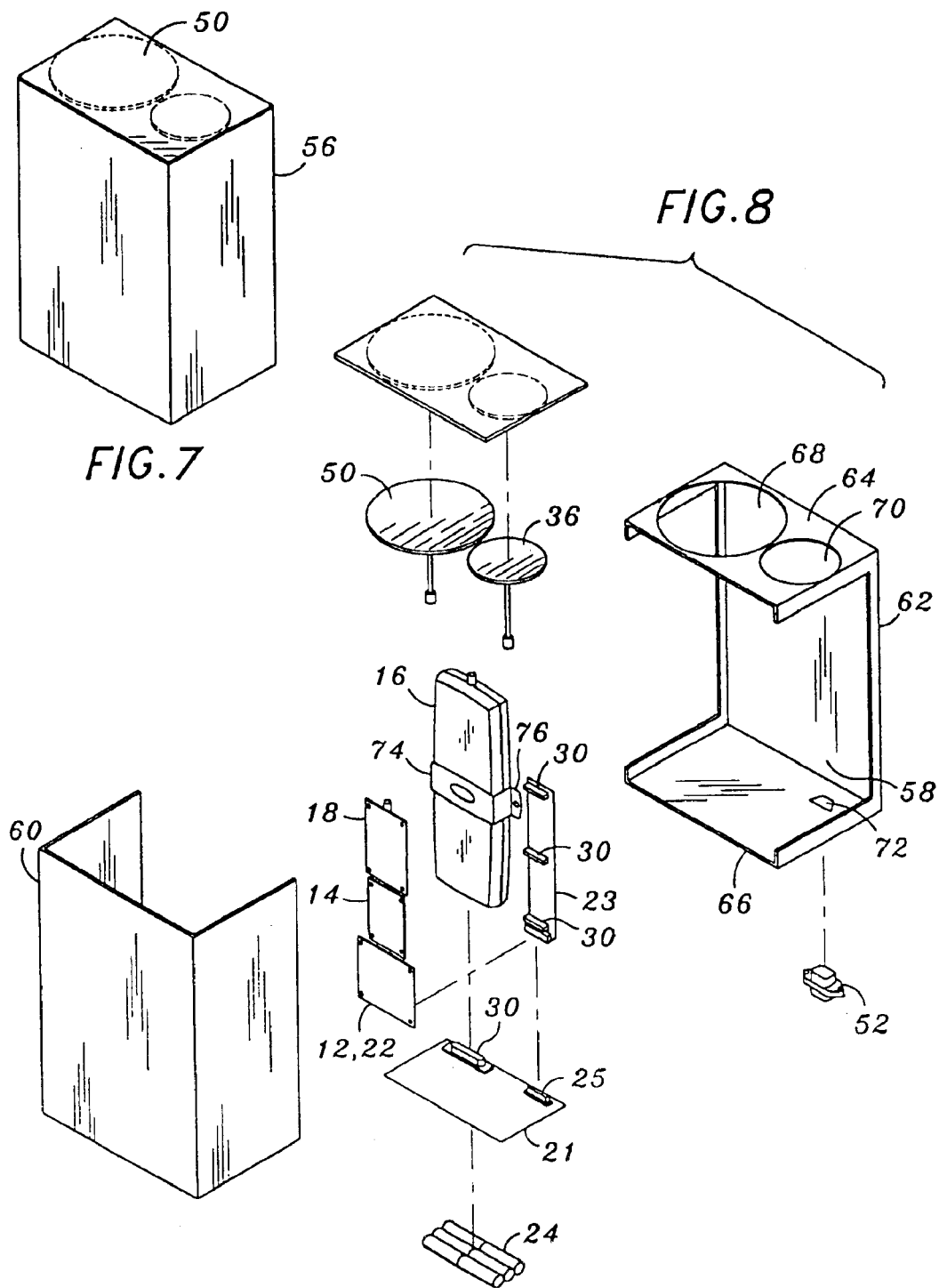

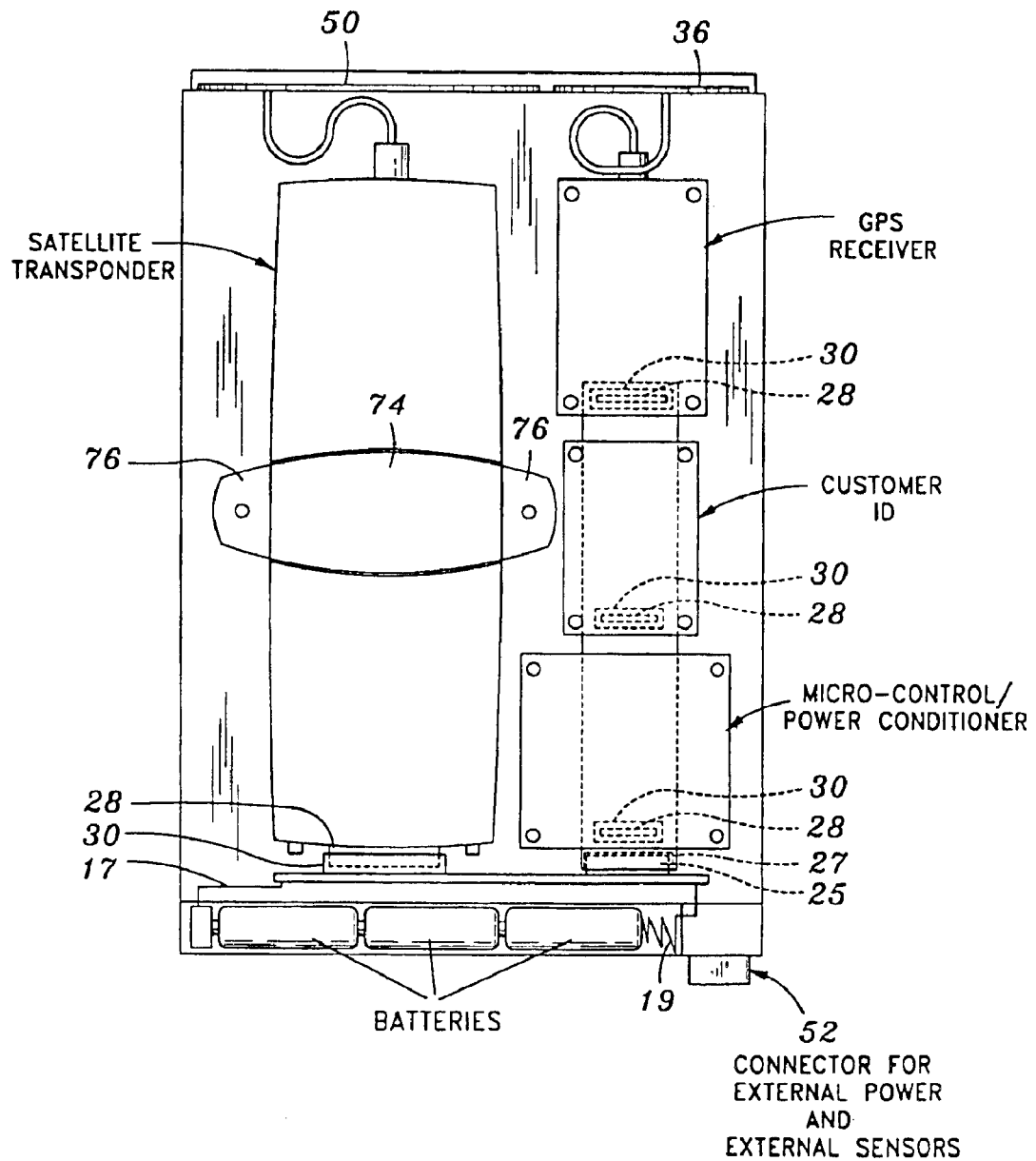

ENERGY CONSERVING SATELLITE TRACKING TAG

CROSS-REFERENCE TO RELATED APPLICATIONS (Not Applicable)

STATEMENT RE: FEDERALLY SPONSORED RESEARCH/DEVELOPMENT (Not Applicable)

FIELD OF THE INVENTION

The present invention relates generally to tracking devices, and more particularly to an energy conserving satellite tracking tag for receiving a location data signal from a global positioning satellite and for communicating with a tracking system. Specifically, the tag is connectable to an external power source to conserve battery power, and has a remotely programmable microprocessor for regulating operation of the tag in an energy efficient manner.

BACKGROUND OF THE INVENTION

Satellite tracking systems can be very helpful for monitoring objects, especially when tracking highly mobile objects which move through remote areas or over great distances. For example, satellite tracking systems can be very useful when tracking the movement of shipping containers, trucks, ships, airplanes, and similar objects which may travel across an ocean or continent. In these circumstances, it would be difficult, if not impossible, to coordinate observers for monitoring the object at regular intervals. Furthermore, it is typically impractical to communicate directly with a tracking tag placed on the object due to the distances involved, the size and cost of the transmitters, and the energy required for transmission. Thus, as satellite technology matures, tracking systems are being developed for communicating with tracking tags by a satellite link.

Although there are a number of satellite tracking systems and devices in the prior art, the energy consumed by current tracking tags can impair the reliability of the tracking system or force a compromise in tracking accuracy. Energy consumption can be a problem because the tags typically operate in remote areas where a reliable external power source may not be available, yet the tags require energy to gather data from sensors and transmit information to a satellite. For this reason, tags are generally provided with batteries. However, the battery power may be exhausted prematurely depending on the duration of the tracking period, the frequency of tag transmissions, and the quantity and type of information transmitted. In some cases greater battery capacity can be provided, but this solution increases the size and cost of the tag. Moreover, even a large battery supply can be exhausted if the surveillance period is unexpectedly long. For instance, when tracking a shipping container, the shipment may be delayed, diverted, or stolen. In these situations, the tracking system may have its greatest utility, however, the limited battery capacity jeopardizes the tracking process.

To address this problem, some tags have been developed to minimize power consumption by collecting and transmitting data at pre-selected intervals according to an internal timer. This solution, however, can reduce tracking accuracy if information is not received with sufficient regularity. In addition, users cannot adjust the time interval between tag transmissions when unexpected events occur. For example, the pre-selected intervals cannot be modified to provide more frequent transmissions if the tag and object are diverted, nor can the intervals be modified for less frequent transmissions if battery capacity is low. To overcome these problems, some timer operated tags have been developed with two-way communication capability which allow remote adjustment of tag operations, such as Maine (U.S. Pat. No. 5,666,647). These tags, however, still rely on battery power when operational.

In view of the above considerations, a primary object of the present invention is to provide a tracking tag which is connectable to an external power supply for conserving battery power when an external power supply is available.

Another object of the present invention is to provide a microprocessor for recognizing the availability of an external power source and for connecting and disconnecting the tag from a battery power supply depending on the availability of an external power supply.

Yet another object of the present invention is to provide a tag with dual mode operation capability in which the tag is continuously activated in a full power mode when an external power source is available, and intermittently activated in a battery conserving mode when battery powered.

Still another object of the present invention is to provide two-way radio frequency communication capability so that both modes of tag operation can be remotely adjusted to conserve energy, to increase the frequency of tag communications, or to change the content of the information transmitted by the tag.

These and other objects of the present invention will become apparent throughout the description thereof which now follows.

BRIEF SUMMARY OF THE INVENTION

The present invention is an energy conserving tracking tag for receiving a radio frequency location data signal from a global positioning satellite for communicating with a tracking system. The tag includes a receiver circuit for receiving the location data signal from the global positioning satellite, a customer ID module for generating a unique tag identification signal, a transponder circuit for receiving interrogator command signals and programming command signals from the relay satellite, and a power circuit electrically engageable with a battery power supply and an external power source. The tag also includes a programmable microprocessor in electrical communication with the power circuit, receiver circuit, customer ID module, and transponder circuit. The microprocessor is operative to collect the location data signal, the identification signal, and the command signals, then produce an composite output signal. The transponder is further operative to transmit the composite output signal to the tracking system by radio carrier wave. In the preferred embodiment, the power circuit has a switch circuit for engaging the tag with either the battery power supply or the external power supply, and the switch is regulated by a power engagement signal from the microprocessor. The microprocessor also has a battery timer for producing intermittent battery time signals, and the microprocessor is operative to activate the receiver circuit, customer ID module, and transponder circuit for communication with the satellites in response to the battery time signal when the tag is battery powered. The microprocessor is also provided with a standard timer which produces intermittent standard time signals. The microprocessor is further operative to continuously activate the receiver circuit, customer ID module, and transponder circuit, and to intermittently transmit the composite output signal in response to the standard time signal when the tag is powered from the external power supply.

The tag can also be provided with external sensors and a battery tester in respective electrical communication with the microprocessor for monitoring ambient operating conditions and battery capacity. In addition, the tag can be provided with an impact and corrosion resistant housing to improve reliability in adverse operating conditions.

The tracking tag here taught thus allows connection to an external power supply to conserve battery capacity when an external power source is available. In addition, the microprocessor is operative to automatically switch to an external power supply once the external power supply is connected to the tag. Furthermore, the tag is operated in a battery conserving mode when battery powered, and tag operations can be remotely adjusted by transmitting command signals from the tracking system.

BRIEF DESCRIPTION OF THE SEVERAL VIEWS OF THE DRAWING

Illustrative and presently preferred embodiments of the present invention is shown in the accompanying drawings in which:

FIG. 2 is a perspective view of an energy conserving satellite tracking tag with a weatherproof casing, a whip antenna, and a flat antenna;

FIG. 3 is an exploded perspective view of the tag of FIG. 2;

FIG. 4 is a left side view of the tag of FIG. 2 with part of the weatherproof casing removed to show a programmable microprocessor, a power conditioner, a customer ID module, a satellite transponder, and a global positioning system (GPS) receiver;

FIG. 7 is a perspective view of an energy conserving satellite tracking tag with a weatherproof casing and two flat antennas;

FIG. 8 is an exploded perspective view of the tag of FIG. 7; and

FIG. 9 is a left side view of the tag of FIG. 7 with part of the weatherproof casing removed.

DETAILED DESCRIPTION OF THE INVENTION

Figure 1:
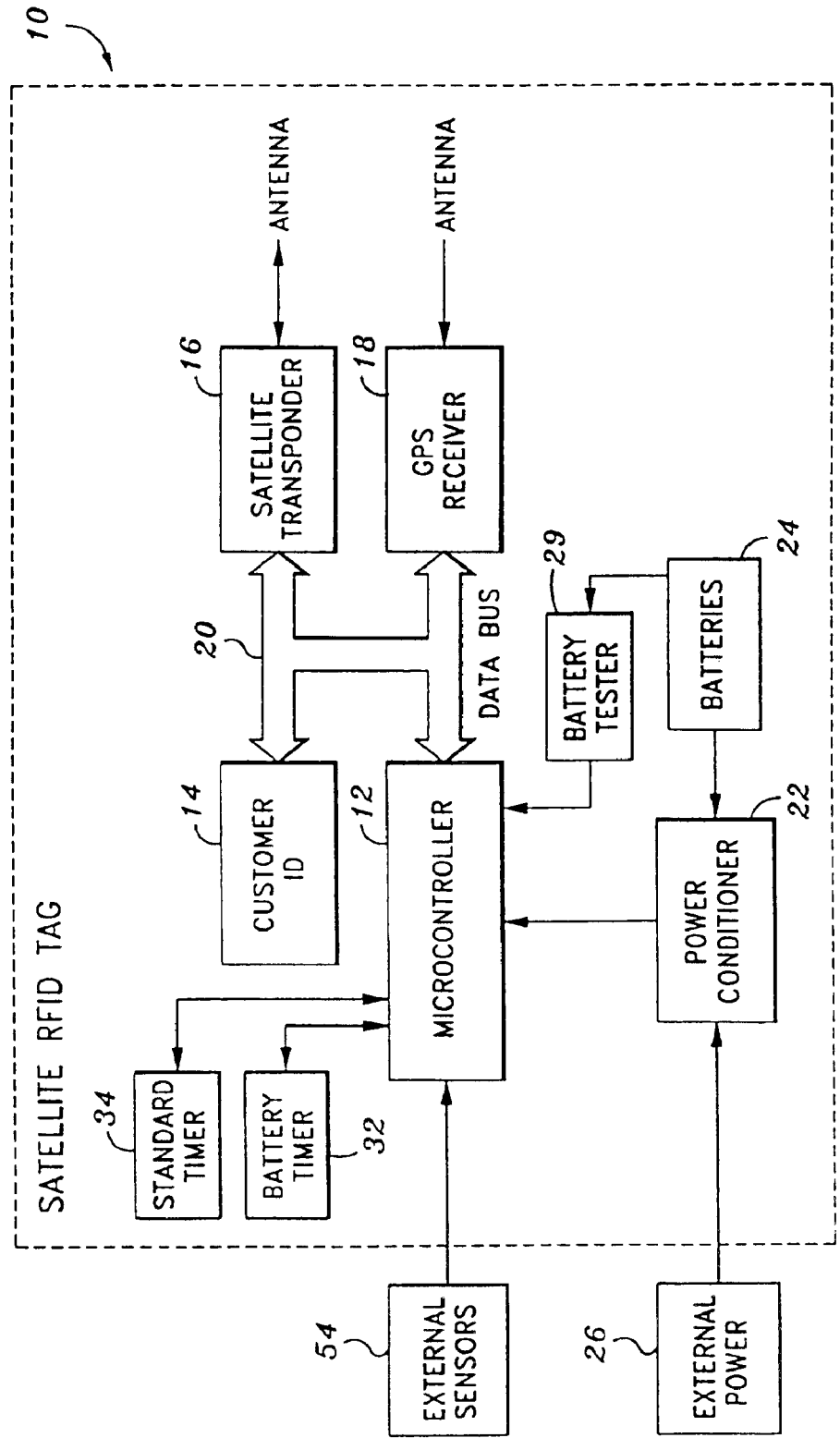
FIG. 1 shows a block diagram of an energy conserving satellite tracking tag.

Referring now to the drawings wherein the showings are for purposes of illustrating preferred embodiments of the present invention only, and not for purposes of limiting the same, FIGS. 1–3 illustrate a satellite tracking tag 10. The tag 10 includes a microprocessor 12, a customer ID module 14, a satellite transponder 16, and a global positioning satellite (GPS) receiver 18 electrically interconnected by a parallel databus 20. As shown in FIGS. 1, 4, and 9, the tag 10 further includes a power conditioner 22 which is integrally connected to, and in electrical communication with, the microprocessor 12. The power conditioner 22 is also engageable with a battery power supply 24 included with the tag 10 and an external power source 26. With this circuit configuration, the power conditioner 22 provides the microprocessor 12 with electric power by engaging either the battery power supply 24 or the external power source 26. The databus 20 then distributes electric power from the microprocessor 12 to the module 14, transponder 16, and GPS receiver 18.

As described in connection with FIG. 1, the databus 20 also provides two way signal communication between the microprocessor 12, the module 14, transponder 16, and receiver 18. As particularly shown in FIGS. 3, 4, 8, and 9, the microprocessor 12, module 14, transponder 16, and receiver 18 can be provided with respective standard plugs 28 for electrically engaging respective standard receptacles 30 disposed on the databus 20. For greater portability, the databus 20 is preferably assembled from a first segment 21 and a second segment 23 arranged at a ninety degree angle and electrically joined by engaging a standard plug 25 disposed on the first segment 21 with a standard receptacle 27 disposed on the second segment 23. In this manner, electrical and signal communication is accomplished, although persons skilled in the art will recognize, of course, that other means can be provided for electrical and data communication, such as microcircuitry.

Referring to FIGS. 1 and 3–5, the microprocessor 12 can be a standard control card with memory for storing start-up procedures, programming, data tables, and variables for operating programs. In the preferred embodiment, the microprocessor 12 also includes a timing circuit having a battery timer 32 and a standard timer 34 which generate an intermittent battery time signal and an intermittent standard time signal respectively. As will be described in further detail below, the microprocessor 12 produces various control signals for operating the tag 10, collects various data signals and sensors provided with the tag 10, and generates a composite output signal for transmission by the transponder 16. For these operations, the microprocessor 12 utilizes the battery time signal to activate the module 14, transponder 16, and receiver 18 less frequently when the tag 10 is battery powered. On the other hand, when the tag 10 is powered from an external source, the module 14, transponder 16, and receiver 18 are continuously activated, and scanned for data by the microprocessor 12 when the standard timer 34 produces a standard time signal.

The battery is tested by a battery tester 29, and this battery tester 29 is used even when the tag 10 is running on external power. In the preferred embodiment, the tag 10 includes a battery tester 29 in electrical communication with the microprocessor 12 and the battery power supply 24. The battery tester 29 can include a resistor in electrical communication with the battery power supply 24, and a current meter connected to the resistor. With this type of battery tester 29, the current meter measures the current across the resistor and produces a corresponding battery data signal. The microprocessor 12 then compares the battery data signal with a theoretical current value stored in the memory of the microprocessor 12 to produce a battery life data signal corresponding to the remaining battery capacity. The battery life data signal is then included in the composite output signal so that persons tracking the tag can determine the remaining battery life. Alternatively, the battery tester 29 can consist of a voltage measuring circuit that measures the present value of the battery's voltage and reports that measurement to the microprocessor 12 over a digital data bus, for example using an analog to digital voltage converter (A/D).

Figure 5:
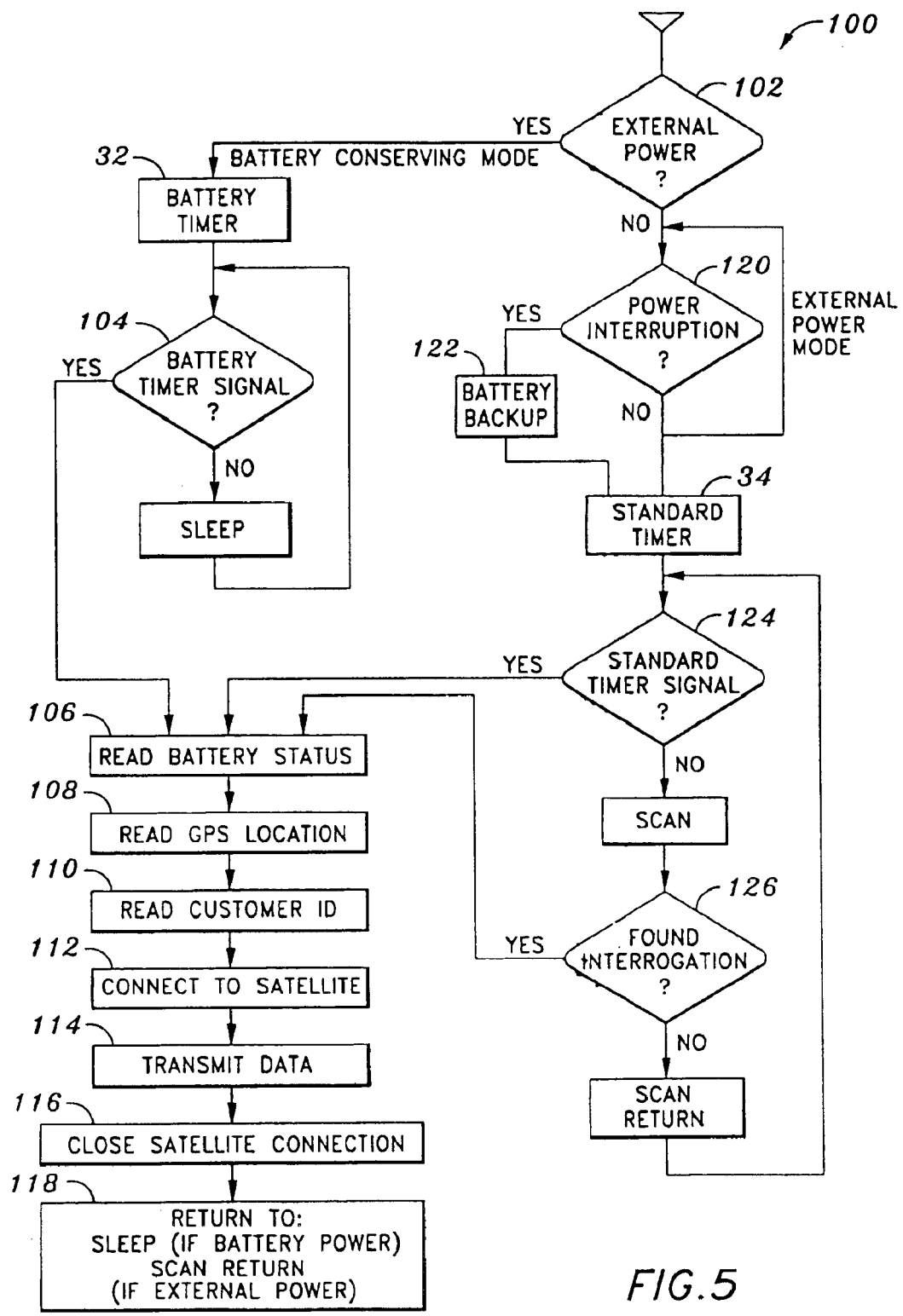
FIG. 5 shows a flow diagram of the tasks performed by the microprocessor.

Referring to FIGS. 1 and 5, the customer ID module 14 produces a unique tag identification signal which is acquired and stored by the microprocessor 12. The identification signal is then included in the composite output signal so that users may distinguish the tag 10 from other tracking tags. The module 14 can be a global system mobile communications subscriber identification module (GSM SIM) which produces identification signals according to the SIM format established in the GSM cellular radio industry. Alternatively, the module 14 can be a standard memory circuit for storing unique tag identification data such that the identification data can be repeatedly collected and included in the composite output signal. The module 14 additionally has a switch circuit (not shown) for engaging and disengaging the databus 20. The switch circuit is operable by an enable signal from the microprocessor 12 so that the module 14 can be disabled, or powered down, as necessary to conserve energy.

Figure 6:
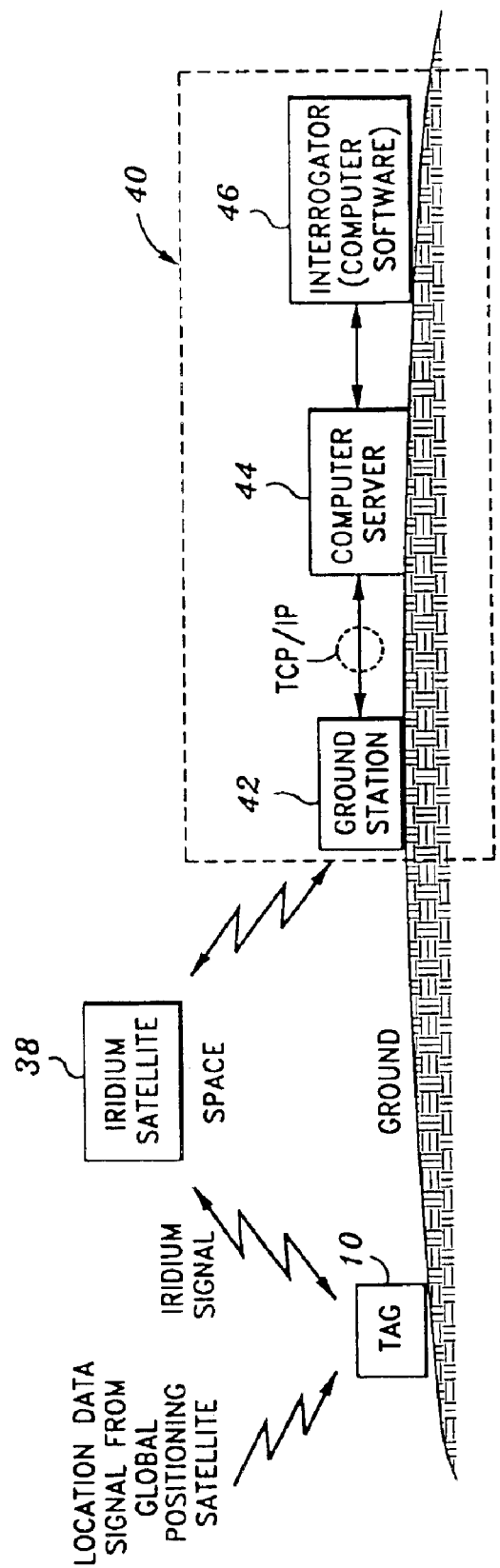
FIG. 6 shows an environment in which the tag is practiced.

As described in FIGS. 1 and 6, the GPS receiver 18 receives location data signals from an orbiting global positioning satellite (not shown). The microprocessor 12 collects the location data signals and includes the location data signal in the composite output signal so that users can determine the location of the tag 10 when the output signal is transmitted. The receiver 18 additionally has a switch circuit (not shown) for engaging and disengaging the databus 20. The switch circuit is operable by an enable signal from the microprocessor 12 so that the receiver 18 can be powered down as necessary to conserve energy. The receiver 18 can be a standard global positioning system receiver which typically produces a location data signal accurate to within 100 meters. As shown in FIGS. 2 and 3, the receiver 18 has a flat type antenna 36 for communicating with the global positioning satellite, however, persons skilled in the art will recognize that other types of antennas may be employed such as coil, dish, or whip type antennas. Additionally, the receiver 18 can be provided with an extension cord for making a remote connection with the flat antenna 36 to improve reception in those circumstances where the tag 10 and receiver 18 are shielded from satellite signals. When the flat type antenna 36 is utilized, the antenna should be oriented skyward to promote reception.

Referring again to FIGS. 1 and 6, the transponder 16 receives the composite output signal from the microprocessor 12, and then transmits the composite output signal by radio carrier wave to a relay satellite 38 for subsequent relay to a tracking system 40. Similarly, the transponder 16 receives command signals from the tracking system 40 by radio carrier waves relayed from the relay satellite 38. The relay satellite 38 can be an Iridium, Teledesic, or similar radio frequency satellite which provides a satellite time data signal for the tracking system 40. It is recognized, of course, that the tag 10 can also be provided with a clock timer so that time data can be included in the output signal to facilitate communication with other types of radio frequency relay satellites.

The tag 10 obtains its time stamp by sending the GPS time that was computed in the GPS receiver prior to transmission from the tag 10 to the satellite. The time stamp is generated as a matter of normal operation in a standard GPS receiver. The GPS signal provides a format to compute both accurate time and accurate position as known to those skilled in the art, and as a result the time and position information is available from the data output of all common brands of GPS receivers.

The tracking system 40 and its components may be configured in a variety of ways, but for purposes of illustration, the tracking system 40 shown in FIG. 6 includes a ground station 42 having a transmitter and a receiver (not shown) for communicating with the satellite 38. The tracking system 40 further includes a computer server 44 operating according to an interrogator software program 46. For compatible communications, the tag 10 and computer server 44 are preferably programmed to utilize standard transmission control protocol and internet protocol (TCP/IP).

To facilitate satellite transmission and reception, the transponder 16 is provided with a whip type antenna 48, as shown in FIGS. 2 and 3. Alternatively, the transponder 16 can be provided with a flat antenna 50 as shown in FIGS. 7–9, or other suitable antennas such as coil or dish type antennas. When a whip type antenna is provided, it may be desirable to align the antenna parallel to the ground, or at a substantially 45 degree angle to the ground, because whip type antennas have a donut shaped radiation pattern which peaks at the horizon when vertically oriented. Like the receiver 18, the transponder 16 can also be provided with an extension cord for making a remote connection with the antenna 48, 50 when the tag 10 and transponder 16 are shielded from satellite signals. In the preferred embodiment, the transponder 16 additionally has a switch circuit (not shown) for engaging and disengaging the databus 20. The switch circuit is operable by an enable signal from the microprocessor 12 so that the transponder 16 can be powered down as necessary to conserve energy.

Referring to FIGS. 1, 3, 4, 8, and 9, the power conditioner 22 is electrically connected to the databus 20, and the databus 20 has a separate circuit (not shown) connecting the power conditioner 22 with the electrical leads 17, 19 of the battery power supply 24. When the transponder 16 is provided with a whip antenna 48, the preferred battery power supply comprises six AA Lithium batteries having a shelf life of at least 10 years when unused. In this embodiment, the batteries are connected in two parallel chains of 3 batteries each as shown in FIG. 3. On the other hand, if the transponder 16 is provided with a flat antenna 50 as shown in FIG. 8, nine AA Lithium batteries are preferred, connected in three parallel chains of three batteries each. Persons skilled in the art will also recognize that other types and quantities of batteries can be provided to improve battery performance or reduce battery cost, and additionally, that the battery configuration can be changed to provide greater voltage or to reduce power consumption. The power conditioner 22 is also electrically connected to a standard receptacle 52 which is configured for electrically engaging a standard plug-in cord from an external power source 26. Persons skilled in the art will recognize, of course, that other means can be provided for engaging the power conditioner 22 with an external power source, such as a clamp for making electrical contact with a wire from the external power source.

The power conditioner 22 has a standard power rectifying circuit (not shown) for regulating the voltage and current from the battery power supply 24 and the external power source 26 to ensure compatibility with the tag 10. In doing so, the power conditioner 22 additionally limits the power draw on the battery power supply 24 to conserve battery capacity. The power conditioner 22 also has a switch circuit (not shown) with a first position for electrically engaging the battery power supply 24, and a second position for electrically engaging the external power source 26 connected at the receptacle 52. The microprocessor 12 is programmed to produce a power engagement signal which positions the switch to engage the external power source 26 when an external power supply is connected to the receptacle 52. Otherwise, the power engagement signal from the microprocessor 12 commands the switch circuit to engage the battery power supply 24. For this switching operation, the power conditioner can be provided with a voltage sensor in electrical communication with the receptacle 52, with the voltage sensor being operative to produce a power sensing signal informing the microprocessor 12 that an external power source is connected. Persons with ordinary skill in the art will recognize that the microprocessor 12 must additionally determine that the external power source is compatible with the tag 10 before the external power source is fully engaged. To be compatible, the external power must be sufficient to energize the tag 10, and the power conditioner 22 must be able to rectify the external power. In the preferred embodiment, the power conditioner 22 is configured to accommodate 120 volt alternating current, 240 volt alternating current, and direct current power sources up to 50 volts. It is, of course, recognized that the power conditioner 22 can be configured to accommodate alternating current and direct current with other voltages. Persons of ordinary skill in the art will also recognize that the tag 10 should be provided with a fuse circuit to protect the tag 10 from non-compatible sources of power. It is additionally recognized that other methods may be employed for informing the microprocessor 12 of the presence of a satisfactory external power source, such as providing the microprocessor 12 with a voltage sensing circuit electrically connected to the receptacle 52.

The power conditioner 22, when operating from batteries, will enable power management by allowing the microprocessor to put the satellite transponder and GPS receiver in sleep mode, and so conserve battery power. The timer that generates the rate and duration of this sleep mode is contained in the microprocessor, and in this application the timer values are pre-determined, i.e. hard coded, in software in the microprocessor. In a more advanced version the satellite link could remotely program the values of sleep operation by sending timing values to the tag, although this requires synchronizing the satellite transmission to times when the tag is "awake", i.e. when the tag is in non-sleep mode of operation. When the tag is connected to an external power source 26, the tag's power conditioner 22 also provides a means of recharging the batteries 24. This is acknowledged by battery charging circuitry that is conventional in design as known to those skilled in the art.

As described in FIGS. 1 and 4, the tag 10 can be provided with external sensors 54 to monitor ambient operating conditions. For example, sensors can be provided to measure temperature, humidity, or vibrations in the vicinity of the tag 10 and to produce corresponding ambient data signals. To obtain the ambient data signals from the sensors 54, the microprocessor 12 and external sensors 54 can be electrically connected with the receptacle 52. If one receptacle is so provided, the receptacle 52 is configured for making separate electrical connections with the external power source 26 and the sensors 54. Alternatively, two or more receptacles can be provided with the tag 10 for engaging the external power source 26 and various sensors 54 separately. However, the tag 10 does not need two receptacles because all of the electrical connections are made over one receptacle, and using just one receptacle simplifies the sealing requirements for weatherproofing.

The sensor readings in the tag 10 are sent in digital format to the satellite. The interrogator at the receiving end will normally convert the digital sensor data from the tag 10 into a user-friendly format prior to final display or storage. For example, a temperature sensor reading that was transmitted by the tag 10 would normally be converted from binary into units of degrees Celsius by the interrogator. That process of formatting the data is vitally important to the end user, however that process is implemented by the interrogator and is not part of the operation of the tag 10.

Referring to FIGS. 2, 3, 7 and 8, the tag 10 can also be provided with a weatherproof housing 56 with an interior chamber 58 for placement of the tag 10. The housing 56 is preferably constructed from impact resistant materials such as metal, plastic, or fiberglass. Additionally, plastic, fiberglass or similarly inert materials are preferred if the tag 10 will be placed in corrosive environments, such as on cargo ships where sea water and ocean spray may contact the tag 10. To allow assembly, the housing 56 has a front plate 60 and a back plate 62 connected by fasteners (not shown). The back plate 62 additionally has a top panel 64 and a bottom panel 66, wherein the top panel 64 has first hole 68 to permit an electrical connection between the transponder 16 and the antenna 48 or 50, and a second hole 70 to allow an electrical connection between the receiver 18 and the antenna 36. As shown in FIGS. 4 and 9, the first hole 68 and second hole 70 should be sized such that the top panel 64 engages the respective antennas to minimize infiltration of water or dust into the chamber 58. Similarly, the bottom panel 66 of the back plate 62 has a third hole 72 for receiving the receptacle 52, wherein the third hole 72 is sized for the bottom panel 66 to engage the receptacle 52.

Referring to FIGS. 3 and 8, the housing 56 can also include an internal support bar 74 for securing the transponder 16 within the chamber 58 of the housing 56. The support bar 74 has a channel shape for placement around the transponder 16 as the transponder 16 is placed against the backplate 62. The support bar also has two mounting flanges 76 which can be fastened to the back plate 62 with separate fasteners (not shown) for securing the transponder 16 against the backplate 62. The housing can also be provided with a cover plate 78 for each flat antenna provided with the tag 10. Each cover plate has an aperture 80 for exposing the reception surface 82 of the flat antenna 36. The cover plate can be attached to the back plate 62 of the housing 56 with fasteners (not Shown) inserted through fastener holes 84 disposed in substantial alignment on the cover plate 78 and top panel 64.

In use, the microprocessor 12 regulates operation of the tag 10 according to a program 100 described by the flow chart in FIG. 5. When the tag 10 is energized, the microprocessor will perform a task 102 to determine if the tag 10 is powered by an external power supply 26. To make this determination, the microprocessor 12 can receive a power sensing signal from the power conditioner 22, or the microprocessor 12 can directly monitor the receptacle 52 as described above.

More particularly, the microprocessor 12 will sense the presence of external power 26 by reading a digital status line in the power conditioner 22. A logic high in the status line of the power conditioner will indicate the presence of external power at the tag receptacle, and a logic low in the status line will indicate the lack of external power at the tag receptacle.

If an external power source is not present, the microprocessor 12 proceeds to task 104 and regulates operation of the tag 10 in a battery conserving mode. According to task 104, the customer ID module 14, satellite transponder 16, and GPS receiver 18 are disabled in a powered down state, or sleep state, until the battery timer 32 produces a battery time signal. In the preferred embodiment, the battery timer 32 can be programmed to produce a time signal at uniform intervals ranging from 1 hour to 24 hours in duration. Persons skilled in the art will recognize, of course, that the battery timer 32 can also be programmed to produce battery time signals at other intervals, provided the interval between battery time signals is longer than the time required for the microprocessor 12 to complete the data acquisition and communication tasks described below.

During sleep mode the microprocessor 12 will shut down most of its internal circuits to conserve power, and operate only the internal circuit that sustains its internal sleep timer. This is a conventional technique that is available in many brands of commercial microprocessors.

When the battery timer 32 produces a battery time signal, the microprocessor 12 sends an enable signal to the respective switches of the module 14, transponder 16, and receiver 18 to electrically engage the databus 20. With the tag 10 fully energized, the microprocessor proceeds to tasks 106–118.

According to task 106, the microprocessor 12 checks battery status and produces a battery life data signal indicating remaining battery capacity as described above. Task 108 obtains a location data signal from the receiver 18. Task 110 obtains a tag identification data signal from the module 14. Task 112 establishes a satellite link for communicating with the tracking system 40. To open communication with the satellite 38 and log onto the computer server 44, the microprocessor 12 provides the transponder 16 with a communication signal which includes standard satellite transmission control protocol codes, standard internet connection protocol codes, a username, and a password which are all stored in the memory of the microprocessor 12. The communication signal is then transmitted by the transponder 16 to the satellite 38.

The tag 10 first sends data to open communications with the interrogator; if that was successful then the tag 10 sends sensor data to the interrogator, as shown in FIG. 5. Once communications are established, task 114 combines the battery life data signal, the location data signal, and the customer data signal to produce an composite output signal for transmission by the transponder 16 to the tracking system 40 by satellite relay. If external sensors are provided with the tag 10, there would be an additional task for obtaining ambient data signals from the sensors 54, and these data signals would be included in the composite output signal as well. Persons of ordinary skill in the art will recognize that the composite output signal will be configured so that the respective data signals can be extracted from the composite output signal by the interrogator program 46. After data transmission is completed, Task 116 powers down the transponder 16 to close the satellite connection. Task 118 then disables the module 14, transponder 16, and receiver 18 until the next battery time signal from the battery timer 32.

An optional capability is provided by the tag 10 in which the microprocessor 12 will scan the optionally provided external sensors, convert those signals to digital data, and include that data in the composite output signal. This optional capability is shown in FIG. 5, in the flow diagram between 108 Read GPS Location and 110 Read Customer ID. Optional means that only some tags will have this capability.

When the tag 10 is awakened from sleep mode, the microprocessor 12 will scan for commands from the interrogator in the satellite link. Moreover, when the tag 10 is energized by an external power source 26, the microprocessor 12 proceeds from task 102 to task 120 and operates the tag 10 in an external power mode. In this mode, the module 14, transponder 16, and receiver 18 are continuously powered. Task 120 determines if there is an interruption in the external power supply. If a power interruption occurs, task 122 commands the power conditioner to engage the batteries 24 as a back-up power supply. The microprocessor 12 then proceeds to task 124 and scans the standard timer 34 for a timeout signal. If the external power supply has not been interrupted, the microprocessor 12 proceeds directly to task 124 and scans the standard timer 34 for a standard time signal. In the preferred embodiment, the standard timer 34 can be programmed to produce a time signal at uniform intervals ranging from 1 minute to 24 hours in duration. As with the battery timer 32, persons skilled in the art will recognize that the standard timer 34 can be programmed to generate a time signal at other time intervals, provided the interval between standard time signals is greater than the time required for the microprocessor 12 to accomplish the data acquisition and communication tasks.

When the standard timer 34 produces a standard time signal, task 124 initiates data acquisition and communication according to tasks 106–116 described above. After task 116 closes the satellite connection, task 118 returns the microprocessor 12 to scanning the standard timer 34 for another standard time signal. If, however, the standard timer 34 does not produce a time out signal, task 126 scans the transponder 16 for command signals from the tracking system 40. If no command signals are received from the tracking system 40, task 126 returns the microprocessor 12 to scanning the standard timer 34 for a standard time signal. On the other hand, when an interrogator command signal is received, task 126 initiates the data acquisition and data communication tasks 106–118. Thus, by transmitting an interrogator command, users can obtain information from the tag 10 upon demand. In addition, users can transmit programming commands to change the tasks performed by the microprocessor 12, change the content of the composite output signal, or to change constants stored in the memory of the microprocessor 12. For example, a programming command can be issued to switch the tag 10 to the battery conserving mode if the external power supply is frequently interrupted. Likewise, a programming command can be issued to disable or enable a particular task, or to add a new task. For instance, a programming command signal can be transmitted from the tracking system 40 to enable scanning of the external sensors and to add the ambient data signals to the composite output signal. Similarly, a programming command signal can be transmitted to add or remove the battery life data signal from the composite output signal. In addition, when the battery capacity is nearly exhausted, a programming command can be issued to increase the time interval between time signals from the battery timer 32. Alternatively, when tracking information is needed more frequently, a programming command can be transmitted to reduce the time interval between the time signals generated by the battery timer 32 or the standard timer 34.

Figure 5A:
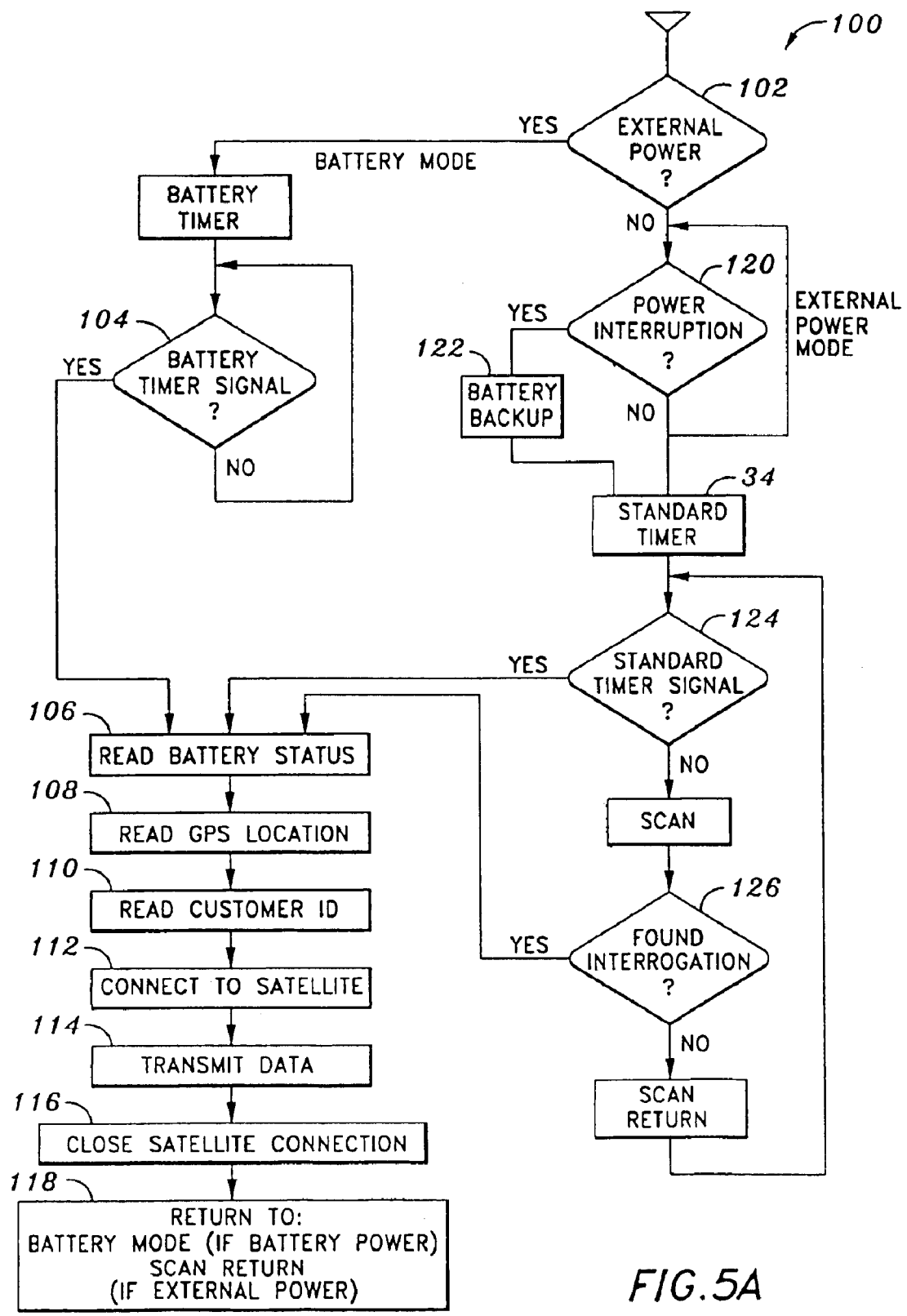
FIG. 5A shows a flow diagram of the tasks performed by the microprocessor in an alternative embodiment.

Referring to FIG. 5A, the microprocessor 12 can also be programmed to operate the tag in either an external power mode or a battery mode. In this embodiment, the external power mode is the same as described above. Likewise, the battery mode is the same as the battery conserving mode described above except that the module 14, transponder 16, and receiver 18 are continuously activated.

In the above manner, the tracking tag described herein is connectable to an external power source to conserve battery power. In addition, the tag provides a microprocessor for recognizing the presence of an external power source and engaging the external power source to conserve battery power. Moreover, the microprocessor is programmed for dual mode regulation of the tag in order to conserve energy when the tag is battery powered. Furthermore, the tag provides two way communication capability for remotely adjusting tag operation to reduce power consumption or increase the frequency of communication with the tracking system. Thus, while it is recognized that illustrative and presently preferred embodiments of the invention has been described in detail herein, it is likewise to be understood that the inventive concepts may be otherwise embodied and employed and that the appended claims are intended to be construed to include such variations except insofar as limited by the prior art.

What is claimed is:

1. A tracking tag for receiving a radio frequency location data signal from an orbiting global positioning satellite and for communicating with a tracking system, the tag being electrically engagable with an external power supply and a battery power supply, the tag comprising:
   a) a receiver having an antenna for receiving the location data signal from the global positioning satellite;
   b) a customer ID module for generating a unique tag identification signal;
   c) a transponder having an antenna for receiving radio frequency command signals from the tracking system;
   d) a power circuit for electrically engaging the battery power supply and the external power supply;
   e) a programmable microprocessor in electrical communication with the power circuit, receiver, customer ID module, and transponder, the microprocessor being operative to receive the location data signal, the identification signal, the command signals, and to produce a composite output signal representative of tag identification and location, the transponder being further operative to transmit the composite output signal by radio carrier wave to the tracking system.

2. The tag as claimed in claim 1 additionally comprising a battery power supply, and wherein the power circuit is electrically engaged to the battery power supply.

3. The tag as claimed in claim 1 wherein the power circuit comprises a power conditioner electrically connected to a receptacle for engaging the external power supply, the power conditioner additionally being electrically connected to the battery power supply and operative to regulate the power received from the external power supply and the battery power supply for compatibility with the tag.

4. The tag as claimed in claim 1 wherein the power circuit includes a switch circuit having a first position for engaging the power circuit to the battery power supply and a second position for engaging the power circuit to the external power supply, the microprocessor being further operative to produce a power engagement signal for regulating switching of the switch circuit between the first and second positions.

5. The tag as claimed in claim 1 wherein the microprocessor is operative to produce enable signals for activating and de-activating the receiver, customer ID module, and transponder.

6. The tag as claimed in claim 5 wherein the microprocessor additionally comprises a timing circuit for generating an intermittent battery time signal and an intermittent standard time signal, the microprocessor additionally being programmed for bimodal regulation of tag operations such that the tag is regulated in a battery conserving mode in which the receiver, customer ID module, and transponder are activated for receiving the location data signal, receiving the identification signal, and transmitting the output signal in response to the battery time signal when the tag is battery powered, and such that the tag is regulated in an external power mode in which the receiver, the customer ID module, and transponder are activated for receiving the location data signal and the identification signal, producing the output signal, and transmitting the output signal in response to the standard time signal when the tag is powered from the external power supply.

7. The tag as claimed in claim 6 wherein the timing circuit generates the battery time signal less frequently than the standard time signal.

8. The tag as claimed in claim 6 wherein the microprocessor is operative to receive command signals when the transponder is activated.

9. The tag as claimed in claim 6 wherein the microprocessor is operative to continuously activate the transponder in the external power mode for receiving command signals from the tracking system.

10. The tag as claimed in claim 6 wherein the microprocessor is operative to receive programming command signals for adjusting the frequency of the battery time signal and the standard time signal.

11. The tag as claimed in claim 6 wherein the microprocessor is operative to receive programming command signals for switching from the battery conserving mode to the external power mode.

12. The tag as claimed in claim 6 wherein the microprocessor is operative to receive programming command signals for switching from the external power mode to the battery power mode.

13. The tag as claimed in claim 6 wherein the microprocessor is operative to receive programming command signals for adjusting the content of the output signal.

14. The tag as claimed in claim 6 wherein the microprocessor is operative to receive an interrogator command signal for prompting the tag to transmit an output signal.

15. The tag as claimed in claim 1 additionally comprising a plurality of external sensors for transmitting respective ambient data signals to the microprocessor, and wherein the microprocessor is operate to include the ambient data signals in the output signal.

16. The tag as claimed in claim 1 additionally comprising a battery tester in electrical communication with the microprocessor and the battery power supply, the battery tester being operative to generate a battery data signal and the microprocessor being operative to receive the battery data signal and to include a battery life data signal in the output signal.

17. The tag as claimed in claim 1 wherein the output signal is transmitted to a relay satellite for relay to the tracking system.

18. The tag as claimed in claim 1 wherein the command signals are received from a relay satellite in communication with the tracking system.

19. The tag as claimed in claim 1 additionally comprising a weatherproof housing, said housing having a front plate connectable to a back plate to form an interior chamber for placement of the tag, said back plate having a first hole for exposing the antenna of the GPS receiver, a second hole for exposing the antenna of the satellite transponder, and a third hole for receiving a receptacle electrically connectable with an external power supply and the external sensors, said housing additionally having an internal support bar connectable with the back plate within the interior chamber for securing the satellite transponder.

20. The tag as claimed in claim 10 wherein the weather proof housing further comprises a pair of cover plates connectable with the housing for respectively securing the antenna of the receiver and the antenna of the transponder to the housing, the cover plates each having an aperture for respectively exposing the antennas so secured.

21. A method for regulating the operating mode of a tracking tag in response to sensed on-board power conditions, the method comprising the steps of:
   a) determining whether the tag is powered by an external power supply;
   b) selectively operating the tag in an external power mode in response to a determination that the tag is powered by the external power supply;
   c) selectively operating the tag in a battery conserving mode in response to a determination that the tag is powered by the external power supply;
   d) wherein the step of operating the tag in the external power mode comprises the steps of:
      i) continuously activating a receiver for receiving a radio frequency location data signal from a global positioning satellite;
      ii) continuously activating a transponder for receiving radio frequency command signals from a tracking system;
      iii) continuously activating a customer ID module electrically connected to the tag for generating a unique tag identification signal;
      iv) collecting the location data signal and the tag identification signal in response to an intermittent standard timer signal from a timing circuit;
      v) producing a radio frequency composite output signal contemporaneously representative of tag location for transmission to the tracking system.

22. The method of claim 21 wherein the step of operating the tag in the external power mode further includes receiving radio frequency command signals from the tracking system when the tag transmits the output signal to the tracking system.

23. The method of claim 21 wherein the step of operating the tag in the external power mode further includes adjusting the time interval between successive standard time signals in response to the command signal from the tracking system.

24. The method of claim 21 wherein the step of operating the tag in the external power mode further includes switching the tag from the external power mode to the battery conserving mode in response to the command signal from the tracking system.

25. The method of claim 21 wherein the step of operating the tag in the external power mode further includes collecting the location data signal and the tag identification signal, then transmitting the output signal in response to the command signal from the tracking system.

26. The method of claim 21 wherein the step of operating the tag in the external power mode further includes obtaining respective ambient data signals from respective ambient sensors in response to the standard time signal, and incorporating the ambient data signals within the output signal transmitted to the tracking system.

27. The method of claim 21 wherein the step of operating the tag in the external power mode further includes obtaining a battery data signal from battery tester in response to the standard time signal, and incorporating a battery life data signal within the output signal transmitted to the tracking system.

28. The method of claim 21 wherein the step of operating the tag in the external power mode further includes adjusting the content of the output signal in response to the command signal from the tracking system.

29. The method of claim 21 wherein the tag receives the command signals from a relay satellite in communication with the tracking system.

30. The method of claim 21 wherein the tag transmits the output signal to a relay satellite in communication with the tracking system.

31. A method for regulating the operating mode of a tracking tag in response to sensed on-board power conditions, the method comprising the steps of:
   a) determining whether the tag is powered by an external power supply;
   b) selectively operating the tag in an external power mode in response to a determination that the tag is powered by the external power supply;
   c) selectively operating the tag in a battery conserving mode in response to a determination that the tag is powered by the external power supply;
   d) wherein the step of operating the tag in the battery conserving mode further comprises the steps of:
      i) powering the tag from a battery power supply;
      ii) intermittently generating a battery time signal from a timing circuit;
      iii) activating a receiver in response to the battery time signal for receiving a location data signal from a global positioning satellite;
      iv) activating a customer ID module electrically connected to the tag in response to the battery time signal for generating a unique tag identification signal;
      v) collecting the location data signal and the tag identification signal in response to activation of the receiver and the customer ID module;
      vi) producing a composite output signal contemporaneously representative of tag location;
      vii) activating a transponder for transmitting the composite output signal by radio carrier wave to a tracking system;
      viii) disabling the receiver, the customer ID module, and the transponder until a subsequent battery time signal is generated by the timing circuit.

32. The method of claim 31 wherein the step of operating the tag in the battery conserving mode further includes receiving radio frequency command signals from the tracking system when the tag transmits the output signal to the tracking system.

33. The method of claim 32 wherein the step of operating the tag in the battery conserving mode further includes adjusting the time interval between successive battery time signals in response to the command signal from the tracking system.

34. The method of claim 31 wherein the step of operating the tag in the battery conserving mode further includes switching the tag from the battery conserving mode to the external power mode in response to the command signal from the tracking system.

35. The method of claim 31 wherein the step of operating the tag in the battery conserving mode further includes obtaining respective ambient data signals from respective ambient sensors in response to the battery time signal, and incorporating the ambient data signals within the output signal transmitted to the tracking system.

36. The method of claim 31 wherein the step of operating the tag in the battery conserving mode further includes obtaining a battery data signal from a battery tester in response to the battery time signal, and incorporating a battery life data signal within the output signal transmitted to the tracking system.

37. The method of claim 31 wherein the step of operating the tag in the external power mode further includes adjusting the content of the output signal in response to the command signal from the tracking system.

38. The method of claim 32 wherein the tag receives the command signals from a relay satellite in communication with the tracking system.

39. The method of claim 31 wherein the tag transmits the output signal to a relay satellite in communication with the tracking system.

40. A method for regulating the operating mode of a tracking tag in response to sensed on-board power conditions, the method comprising the steps of:
  a) determining whether the tag is powered from an external power source;
  b) selectively operating the tag in an external power mode when it is determined that the tag is powered by the external power source, the external power mode comprising the steps of:
    i) continuously activating a receiver for receiving a location data signal from a global positioning satellite;
    ii) continuously activating a transponder for receiving radio frequency command signals from a tracking system;
    iii) continuously activating a customer ID module electrically connected to the tag for generating a unique tag identification signal;
    iv) collecting the location data signal and the tag identification signal in response to an intermittent standard timer signal from a timing circuit;
    v) producing a radio frequency composite output signal representative of tag identification and location for transmission to the tracking system; and
  c) operating the tag in a battery conserving mode when it is determined that the tag is not engaged with the external power supply, the battery conserving mode comprising the steps of:
    i) powering the tag from a battery power supply;
    ii) continuously activating a receiver for receiving the location data signal from the global positioning satellite;
    iii) continuously activating a customer ID module electrically connected to the tag for generating a unique tag identification signal;
    iv) continuously activating a transponder for receiving radio frequency command signals from tracking system by radio carrier wave;
    v) collecting the location data signal and the tag identification signal in response to an intermittent battery time signal from a timing circuit; and
    vi) producing a radio frequency composite output signal representative of tag identification and location for transmission to the tracking system.

41. The method of claim 40 wherein the battery time signal is generated less frequently then the standard timer signal.

* * * * *